United States Patent [19]

McConnell

[11] Patent Number: 5,289,262
[45] Date of Patent: Feb. 22, 1994

[54] PHOTODIODE TRANSMISSIVE MEDIA SENSOR FOR ALIGNING MEDIA

[75] Inventor: Scott K. McConnell, Brea, Calif.

[73] Assignee: CalComp Inc., Anaheim, Calif.

[21] Appl. No.: 848,535

[22] Filed: Mar. 9, 1992

[51] Int. Cl.$^5$ ................... G01B 11/14; G01N 21/86
[52] U.S. Cl. ................... 356/375; 356/434; 250/561
[58] Field of Search ............... 356/372, 373, 375, 394, 356/384–387, 121, 363, 400, 401, 434, 433; 250/560, 561, 571, 559

[56] References Cited

U.S. PATENT DOCUMENTS

| | | | |
|---|---|---|---|
| 3,532,892 | 10/1970 | Murphy | 356/373 |
| 3,870,410 | 3/1975 | Abe | 250/561 |
| 3,886,542 | 5/1975 | Ohtsuka | 250/561 |
| 3,919,560 | 11/1975 | Nopper | 250/561 |
| 4,485,982 | 12/1984 | St. John et al. | 250/560 |
| 4,549,084 | 10/1985 | Markle | 356/400 |
| 4,557,602 | 12/1985 | Ueda | 356/372 |
| 4,730,931 | 3/1988 | Watson | 250/571 |
| 4,736,224 | 4/1988 | Watanabe et al. | 250/561 |
| 4,760,271 | 7/1988 | Brenholdt | 356/430 |
| 4,856,902 | 8/1989 | Wiedemann | 356/375 |
| 4,928,008 | 5/1990 | Huggins et al. | 356/375 |
| 4,986,663 | 1/1991 | Cecchi et al. | 356/373 |
| 5,216,258 | 6/1993 | McConnell | 354/434 |

Primary Examiner—Richard A. Rosenberger
Assistant Examiner—Hoa Q. Pham
Attorney, Agent, or Firm—Donald A. Streck; Wm. F. Porter, Jr.

[57] ABSTRACT

The invention is a media positioning system for determining the position of the media relative to reference positions thereof in a media transporter in which media having opposed faces is transported along a path of a track including a spatially varying pattern on the media, the alignment system including a light sensor having a light-sensitive surface facing one face of the media in at least approximate registration with the track, the light-sensitive surface including plural sections, the sensor producing plural signals at an output thereof proportional to the intensity of light impinging on respective ones of the plural sections of the light-sensitive surface, a light source facing the other face of the media and directing a beam of light through the media onto the light-sensitive surface, whereby the plural signals vary as a function of the spatially varying pattern of the track as the media is transported along the path of the track, and signal detection and logic apparatus for converting the plural signals of the light sensor to a pair of Cartesian coordinate positions of the media.

11 Claims, 2 Drawing Sheets

PHOTODIODE TRANSMISSIVE MEDIA SENSOR FOR ALIGNING MEDIA

BACKGROUND OF THE INVENTION

The invention is a media position alignment system for determining the position of the media relative to desired positions thereof in a media transporter in which media having opposed faces is transported along the path of a track including a spatially varying pattern on the media, the alignment system including a light sensor having a light-sensitive surface facing one face of the media in at least approximate registration with the track, the light-sensitive surface including plural sections, the sensor producing plural signals at an output thereof proportional to the intensity of light impinging on respective ones of the plural sections of the light-sensitive surface, a light source facing the other face of the media and directing a beam of light through the media onto the light-sensitive surface, whereby the plural signals vary as a function of the spatially varying pattern of the track as the media is transported along the path of the track, and signal detection and logic apparatus for converting the plural signals of the light sensor to a pair of coordinate positions used by control logic of the media transporter to position or align the media.

Electrostatic, electrophotographic, thermal and pen printers and plotters of the type which record an image on a strip of media moving longitudinally across a transverse linear print head are well-known. Various techniques are known for sensing media for different purposes. For example, U.S. Pat. No. 4,730,931 to Watson discloses a system which monitors light transmitted through the media to monitor fiber orientation in the media, but not for the purpose of positioning the media. U.S. Pat. No. 4,760,271 to Brenholdt discloses a quadrant sensor for monitoring roughness of webbed media. U.S. Pat. No. 3,886,542 to Ohtsuka discloses measuring displacement of a moving member by optically reading a scale with multiple paths and varying gradations imprinted on the member. U.S. Pat. No. 4,549,084 to Markel discloses a mask aligner used in semiconductor integrated circuit fabrication in which alignment errors between a wafer and a mask are sensed using reflected light. The present invention is directed to an improvement in media positioning systems in printers and plotters of the type discussed above. Such media positioning systems are of the type disclosed in U.S. Pat. No. 3,919,560 to Nopper and in U.S. Pat. No. 4,485,982 to St. John et al., in which a sensor senses light reflected from a pre-printed or coded track along one edge of a longitudinally transported strip of webbed media. In Nopper, track markings are reflectively sensed while in St. John et al. a coded track is reflectively sensed.

The media on which such apparatus records an image must be generally aligned with the media sensor. Some media transporters (such as, for example, some color printers) superimpose images on the media. Thus, each frame of the media must make several passes in order to record the several images. For this purpose, after the first image is recorded, the direction of the media travel is temporarily reversed until the media returns to the starting position of the second image. Then, the image is recorded on the media as the media is again transported in the forward direction. As can be appreciated, the accuracy with which the media is positioned prior to and during the recording of the subsequent images directly affects image quality. If there is an error in this alignment, the image is misaligned in proportion to the error. Such misalignment reduces the quality of the recorded image. As one example, in multi-image color recording, any misalignment may cause false colors to be recorded. The alignment of the media at all points during media transport is critical and directly affects image quality.

This problem is typically addressed in the prior art in the manner shown in FIG. 1 by the use of a pattern 10 recorded near the edge of the media 12 and a linear multi-pixel image sensor 14 (such as a charge coupled device (CCD)) connected to scan logic 16 which scans reflected light from the pattern 10 as the media 12 moves across the sensor 14 and develops a signal used by control logic of the printer or plotter to position the media 12. Typically, the recorded pattern 10 is a broken line with a series of rectangles along it. The CCD sensor 14 scans the media 12 and visually "reads" the pattern 10 to determine media position as the media 12 is returned to the starting position for the recording of the next image. The control logic of the printer or plotter processes the signal generated by the CCD sensor 14 to generate an error signal which is used to correct any misalignment of the media with respect to desired positions. The manner in which the signal generated by the CCD sensor 14 is used to correct the alignment of the media 12 with respect to the desired positions is well-known.

One significant problem with this prior art technique is that it is expensive to implement, in that it requires a linear array scanner or sensor 14 (typically a CCD) including all the timing and processing circuitry associated therewith. Another problem is that reflective mode sensing does not provide adequate signal-to-noise ratio with transparent media. Moreover, this technique has been found to produce error prone plots of marginal quality and requires a user alignment procedure.

Accordingly, it is an object of the present invention to accurately correct media alignment errors in a multi-pass media transporter without requiring a linear array scanner in order to reduce cost.

It is a further object of the invention to sense the two-dimensional position of the media from a track on the media using a quadrant photodiode sensor instead of a linear array scanner.

It is another object of the invention to sense the track with significantly improved signal-to-noise ratio even with transparent media.

It is a yet further object of the invention to sense the two-dimensional position of the media from the track without having to sense reflected light from the media but rather by sensing light transmitted through the media.

These and other objects and benefits of the invention will become apparent from the detailed description which follows hereinafter when taken in conjunction with the drawings which accompany it.

SUMMARY OF THE INVENTION

The invention is a media position alignment system for determining the position of the media relative to a desired position in a media transporter in which media having opposed faces is transported along a track with a spatially varying pattern on the media, the alignment system including a light sensor having a light-sensitive surface facing one surface of the media in at least approximate registration with the track, the light-sensitive surface including plural sections, the sensor producing plural signals at an output thereof proportional to the intensity of light impinging on respective ones of the plural sections of the light-sensitive surface, a light source facing the other surface of the media and directing a beam of light through the media onto the light-sensitive surface, whereby the plural signals vary as a function of the spatially varying pattern of the track as the media is transported along the track, and signal detection and logic apparatus for converting the plural signals of the light sensor to a pair of coordinate positions of the media.

In a preferred embodiment, the signal detection and logic apparatus include a device for generating a first coordinate position signal proportional to the difference between the signals of quadrant pairs disposed in a first direction, and apparatus for generating a second coordinate position signal proportional to the difference between the signals of quadrant pairs disposed in a second direction. In one embodiment, the media is moved in two dimensions (laterally and longitudinally) in the plane of the media and plural sections of the lightsensitive surface include four quadrants in orthogonal alignment with the direction of media travel. The apparatus for generating the first coordinate position signal generates an X position signal (the difference between the output signals of each pair of the quadrants aligned in the longitudinal direction of media movement), and the apparatus for generating the second coordinate position signal generates a Y position signal (the difference between the output signals of each pair of the quadrants aligned in the lateral direction).

In the preferred embodiment, the track is an elongated center stripe in parallel alignment with one direction in which the media is translated by the media transporter. The track may be recorded by the media transporter during the first pass of the media or may be pre-printed.

DETAILED DESCRIPTION OF THE INVENTION

Figure 1:
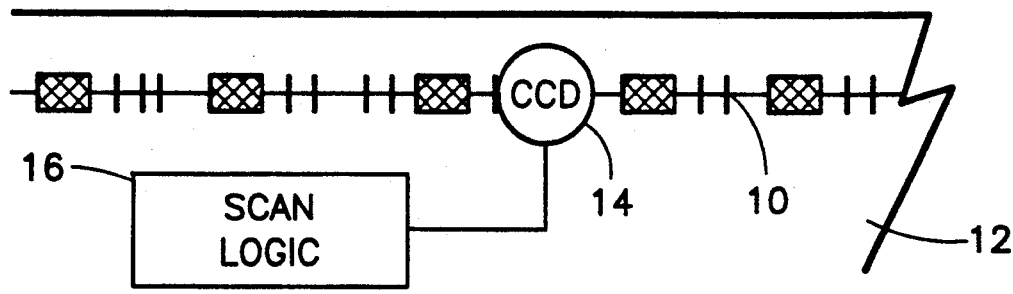
FIG. 1 is a simplified drawing depicting the prior art approach to solving the problem solved by the present invention.

The present invention is based upon sensing at each sensing element of a multi-element light sensor, such as a quadrant photodiode, the light transmitted through the media near a track thereon. The quadrant photodiode is a device well-known in the art which produces four independent voltages proportional to the amount of light incident on four quadrants of a light-receiving plane. Different portions of the pattern of the track on the media shade the light transmitted to each one of the four quadrants of the photodiode differently, so that different amounts of light strike different ones of the quadrants at any instant in time, depending upon the position of the track. In most embodiments of the invention, the position of the track (and therefore of the media) in two orthogonal directions is found by computing the difference in the amount of light striking quadrant pairs juxtaposed in each of the two orthogonal directions. Thus, as shown in simplified form in FIG. 2, the present invention operates by having a light transmissive sensor 18, having four different sensing areas A,B,C,D and attached to scan logic 20, scan a path 22 of a track 10 on the media 12. At any instant in time, the four diode sensing areas generate respective voltages $V_a$, $V_b$, $V_c$, $V_d$, indicating the instantaneous amount of light striking each sensing area A,B,C,D, respectively. The scan logic 20 deduces the instantaneous X and Y coordinate position of the track 10 from the voltages $V_a$, $V_b$, $V_c$, $V_d$.

Figure 4:
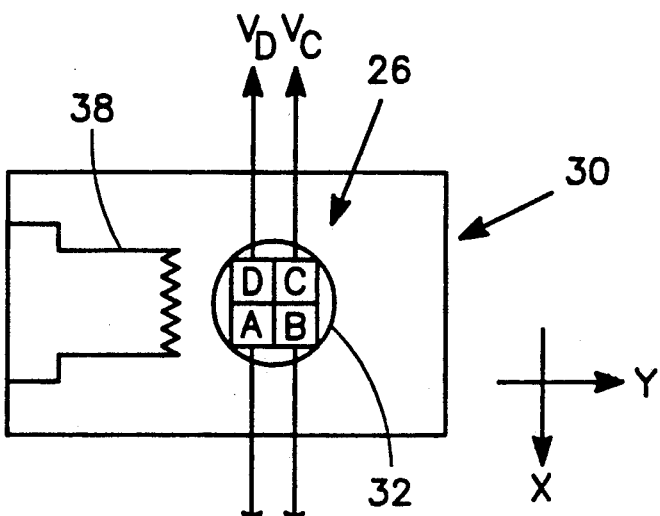
FIG. 4 is a simplified partially cutaway top view of the apparatus of FIG. 3 illustrating how a quadrant photodiode is used in the invention.
Figure 3:
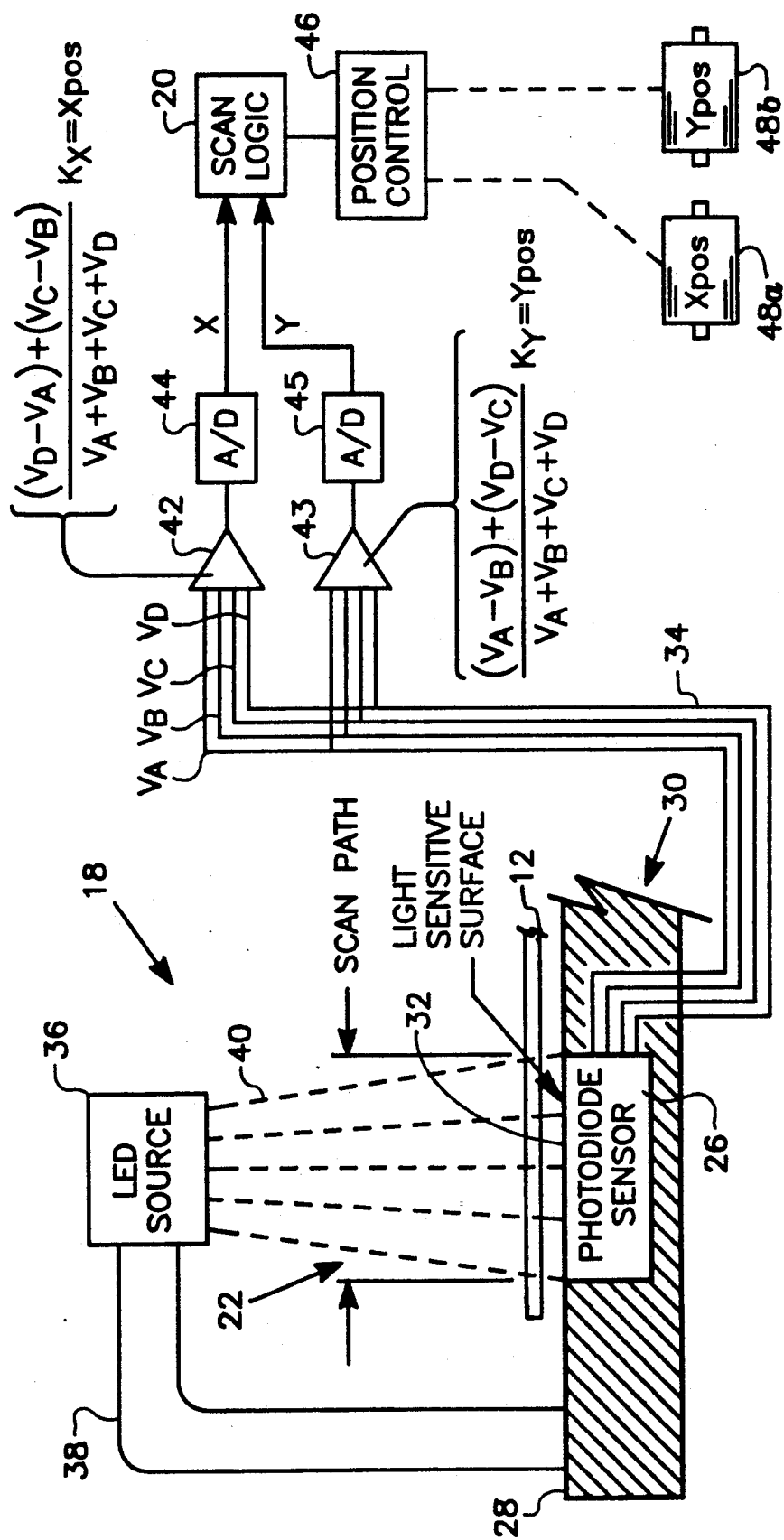
FIG. 3 is a simplified partially cutaway elevational view of the sensing apparatus employed in the present invention.

The preferred apparatus for accomplishing the objects of the present invention is depicted in FIG. 3. The transmissive sensor 18 includes a quadrant photodiode or light sensor 26 disposed on the surface 28 of a media transporter 30 over which the media 12 slides. The longitudinal motion of the media 12 in the view of FIG. 3 is into and out of the drawing figure and the lateral motion is left-to-right. The quadrant photodiode 26 is of a type well-known in the art which has a light sensitive surface 32, a portion of which preferably includes four equal sized areas A,B,C,D, as best shown in FIG. 4. The four areas transmit on a multi-conductor output line 34 individual electrical output voltages $V_a$, $V_b$, $V_c$, $V_d$ proportional to areas A,B,C,D, respectively, of the light sensitive surface 32.

Figure 2:
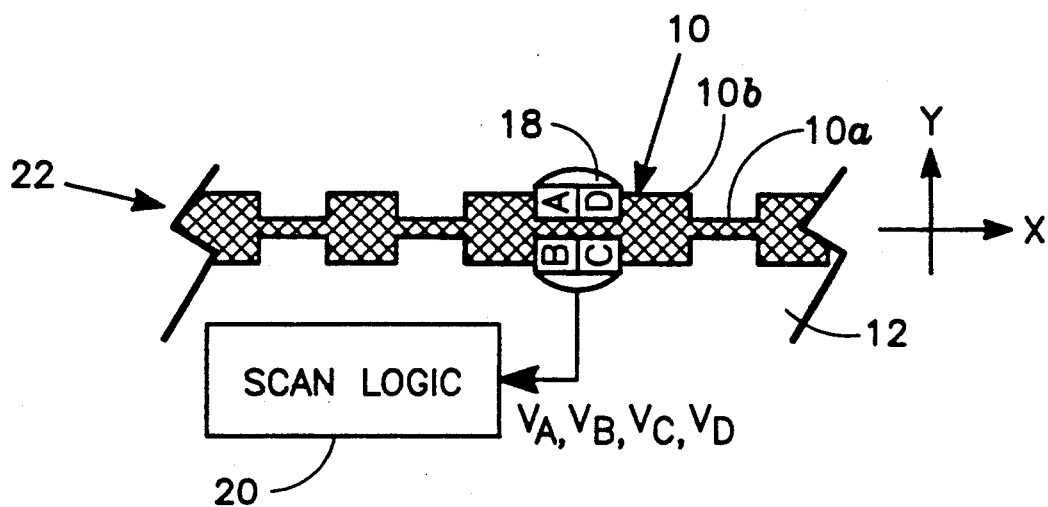
FIG. 2 is a simplified drawing depicting the present invention's approach to solving the same problem.

In the specific example illustrated in FIG. 2, the track 10 includes a thin center stripe 10a and a series of large squares 10b. The dimensions of the large squares 10b is approximately equal to the dimensions of the square including the four quadrant areas A,B,C,D. The periodic spacing between adjacent large squares 10b is approximately equal to the width of the square including the four quadrants areas A,B,C,D. This configuration offers many benefits and is therefore the preferred embodiment. In particular, this embodiment maximizes the change in light intensity at each quadrant of the light sensitive surface 32 as the media 12 is translated and assures that the light intensity always changes as the media 12 moves in either the X or Y directions. Each one of the large squares 10b shades all four quadrants of the light sensitive surface 32 during each instant in time that it is centered over the square including the four quadrants of the light sensitive area 32. Moreover, the spaces between adjacent ones of the large squares 10b permit a minimum amount of shading at the four quadrants during each instant in time that the square including the four quadrant areas of the light sensitive surface 32 is centered between adjacent ones of the large track squares 10b. There are further advantages. With each quadrant are A,B,C,D of the light sensitive surface having a relatively large finite area (as distinguished from being a point), the quadrant photodiode 26 integrates the light transmitted through a finite area of the media 12 for a better signal-to-noise ratio. By being close to or in contact with the media 12, the photodiode 26 is more sensitive to the track 10.

The other major component of the transmissive sensor 18 is the light source 36. The light source 36 is held above the photodiode 26 in spaced relationship thereto by the arm 38. The preferred light source 36 includes an LED emitting a beam 40 directed onto the light sensitive surface 32.

In operation, the X position of the track 10 is proportional to the difference between the output voltages of pairs of the four quadrants aligned in the X direction of FIG. 2, namely the differential outputs of each quadrant pair [A, D] and [B, C]. Likewise, the Y position of the track 10 is proportional to the difference between the output voltages of pairs of the four quadrants aligned in the Y direction of FIG. 2, namely the differential output of each quadrant pair [A, B] and [C, D]. Mathematically the foregoing may be expressed by defining the X coordinate position of the media in relation to the track as:

$$X = K_x[(V_d - V_a) + (V_c - V_b)]/(V_a + V_b + V_c + V_d), \quad (1)$$

and by expressing the Y coordinate position of the media in relation to the track 10 as:

$$Y = K_y[(V_a - V_b) + (V_d - V_c)]/(V_a + V_b + V_c + V_d), \quad (2)$$

where Kx and Ky are constants of proportionality relating the voltages generated by the light sensitive surface 32 to the units in which the X and Y coordinate positions of the track 10 are measured. These constants of proportionality are readily determined by a skilled worker. However, in some applications of the invention it is not necessary to generate or measure the coordinates of the media position, and therefore the constants of proportionality may be dispensed with, and consequently the normalization term $V_a + V_b + V_c + V_d$ may be dispensed with.

An analog amplifier circuit 42, using well-known circuit design techniques, generates a voltage equal to the sum of the differences between the voltages of the quadrant pairs [A,D] and [B,C] (i.e., those pairs aligned in the X direction) normalized by the sum of the voltages of all four quadrants and multiplied by the appropriate constant of proportionality, as defined in Equation 1 above, generating the X coordinate position of the track 10. (In another preferred embodiment, the multiplication by a constant is performed in software, rather than by an analog circuit.)

An analog amplifier circuit 43, using well-known circuit design techniques, generates a voltage equal to the sum of the differences between the voltages of the quadrant pairs [A,B] and [C,D] (i.e., those pairs aligned in the Y direction) normalized by the sum of the voltages of all four quadrants and multiplied by the appropriate constant of proportionality, as defined in Equation 2 above, generating the Y coordinate position of the track 10.

However, such normalization and the use of two pairs of quadrants is not always required, depending upon the implementation of the invention. For example, in one alternative embodiment a media is employed and the track is carefully recorded with nearly uniform density, so that the media movement and position along a given direction can be determined from the instantaneous amplitude of the sinusoidal output of a single element photodiode.

In another alternative embodiment, the power of the light source illuminating the sensor through the media is monitored and adjusted as necessary in accordance with the amplitude of the sensor response, which is periodically monitored for the purpose of compensating for variations in response of the photodiode, emission of the light source and/or light transmissivity of the media.

Since most printers and plotters that would employ the present invention are controlled by digital logic, it is preferred that the output voltage of each of the analog amplifier circuits 42,43 be connected to respective analog to digital converters 44, 45, the outputs of which are applied to the scan logic 20. As a cost saving measure, rather than employing two analog to digital converters 44, 45, the system of FIG. 3 may be modified so that a single analog to digital converter is time-shared between the outputs of the two analog amplifier circuits 42, 43. The two-dimensional scan logic 20 provides an input to the position control logic 46 which controls the motors 48a, 48b. The motor 48a controls the media position in the X (longitudinal) direction and the motor 48b controls the media position in the Y (lateral) direction.

In practice, the track 10 is centered over the quadrant photodiode 26 in the Y direction when the magnitude of the Y position output voltage of the analog amplifier circuit 43 (Equation 2) is at a minimum. The X position output voltage of the analog amplifier circuit 42 (Equation 1) alternates between maxima and minima as each large square 10b of the track 10 passes over the center of the light sensitive surface 32. The width of the center stripe 10a of the track 10 is a necessary tradeoff to optimize the signal-to-noise ratio for both the X position and Y position signals.

The invention has been reduced to practice and it has been able to determine the position of the media 12 in a printer/plotter to within ±0.0005 inch in the X direction and to within ±0.0001 inch in the Y direction.

Wherefore, having thus described the invention, what is claimed is:

1. In a media transporter in which media having opposed faces is transported along a path of a track on said media, a media position alignment system for determining the position of the media relative to reference points thereof, comprising:

(a) a light sensor having a light-sensitive surface facing one face of the media in at least approximate registration with said track, said light-sensitive surface comprising plural sections, said sensor producing plural signals at an output thereof proportional to the intensity of light impinging on respective ones of said plural sections of said light-sensitive surface;

(b) a spatially varying pattern forming said track and including, (b1) an elongated center stripe in parallel alignment with the path in which said media is moved, said stripe having a width less than the width of a square portion comprising said plural sections of said light-sensitive surface, and, (b2) a series of spaced squares centered along said center stripe and extending beyond the width of said stripe wherein each of said squares is of generally the same orientation and approximate size as the square portion comprising the plural sections of said light-sensitive surface, and wherein spacing between adjacent ones of said squares is uniform and is about equal to the length of the square comprising the plural sections of said light-sensitive surface;

(c) a light source directing a beam of light through the opposite face of the media onto said light-sensitive surface, whereby said plural signals vary as a function of said spatially varying pattern of said track as said media is transported along the path of said track; and (d) signal detection and logic means for converting said signals to representations of position of said media.

2. The system of claim 1 wherein said signal detection and logic means comprise:
   means for generating a first coordinate position signal proportional to the difference between the signals of pairs of said sections disposed in a first direction; and
   means for generating a second coordinate position signal proportional to the difference between the signals of pairs of said sections disposed in a second direction.

3. The system of claim 2 wherein:
   (a) said plural sections of said light-sensitive surface comprise four quadrants in alignment with directions of movement of said media;
   (b) said means for generating said first coordinate position signal comprises means for generating an X position signal comprising the difference between the output signals of each pair of said quadrants aligned in a first direction; and
   (c) said means for generating said second coordinate position signal comprises means for generating a Y position signal comprising the difference between the output signals of each pair of said quadrants aligned in a direction perpendicular to said first direction.

4. The system of claim 2 wherein said detection and logic means further comprise means for normalizing each of said first and second coordinate position signals with respect to the sum of the output signals of all of said sections of said light-sensitive surface.

5. In a media transporter which transports media in the direction of a track on said media, a media position alignment system, comprising:
   (a) means for sensing a plurality of individual intensities of light transmitted through said media, said sensing occurring at a plurality of individual sensing locations wherein said plurality of individual sensing locations are variably shaded from said transmitted light by said track; and,
   (b) spatial variations of said track characterized by,
      (b1) an elongated center stripe along the direction in which said media is moved, and,
      (b2) a series of spaced symmetrical shapes having a line of symmetry coincident with said center stripe and extending beyond the width of said stripe wherein each of said symmetrical shapes is of generally the same orientation and approximate size as an area comprising the plurality of individual sensing locations, and wherein spacing between adjacent ones of said symmetrical shapes is uniform and is about equal to the length of the area comprising the plurality of individual locations;
   (c) means for generating a position signal from said plurality of light intensities.

6. The system of claim 5 wherein said means for generating a position signal comprises:
   means for generating a first coordinate position signal proportional to the difference between the light intensities at pairs of said locations disposed in a first direction; and
   means for generating a second coordinate position signal proportional to the difference between the light intensities at pairs of said locations disposed in a second direction.

7. The system of claim 5 wherein said plural locations comprise plural light sensitive sections of uniform finite areas of a light sensitive surface of said means for sensing.

8. In a media transporter which transports media along the path of a track on said media, a method for monitoring the position of said media, said method comprising:
   sensing a plurality of individual intensities of light transmitted through said media, said sensing occurring at a plurality of sensing locations which are variably shaded from said transmitted light by said track which has spatial variations characterized by an elongated center stripe along the direction in which said media is moved, and a series of spaced symmetrical shapes having a line of symmetry coincident with said center stripe and extending beyond the width of said stripe wherein each of said symmetrical shapes is of generally the same orientation and approximate size as an area comprising the plurality of individual sensing locations, and wherein spacing between adjacent ones of said symmetrical shapes is uniform and is about equal to the length of the area comprising the plurality of individual locations; and
   generating a position signal from said plurality of light intensities.

9. The method of claim 8 wherein the step of generating a position signal comprises:
   generating a first coordinate position signal proportional to the difference between the light intensities at pairs of said locations disposed in a first direction; and
   generating a second coordinate position signal proportional to the difference between the light intensities at pairs of said locations disposed in a second direction.

10. The method of claim 9 wherein said first direction is perpendicular to said second direction.

11. The method of claim 8 wherein the step of sensing comprises sensing said transmitted light at plural light sensitive sections of uniform finite areas of a light sensitive surface, said plural sections comprising said plural locations.

* * * * *